Figure 1:
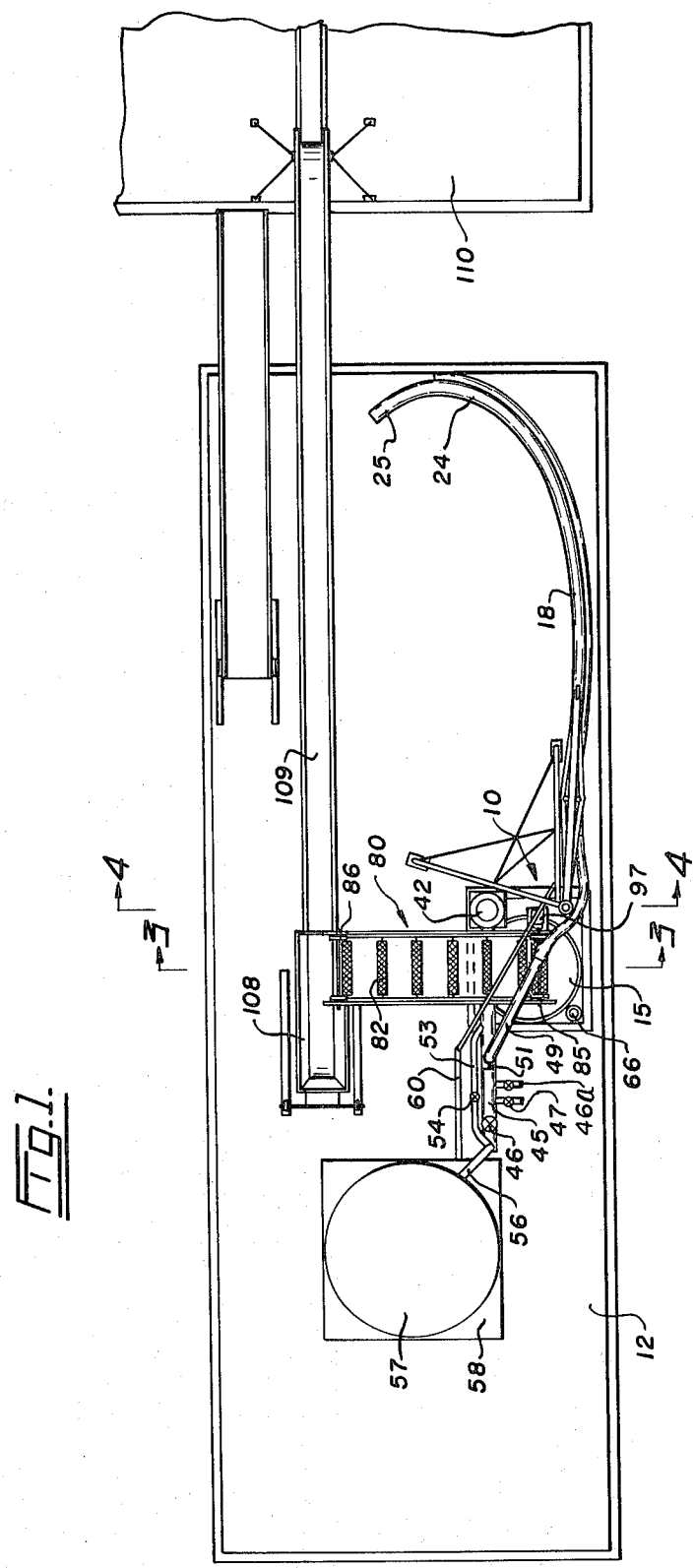

United States Patent [19]

McLean

[11] 3,795,325

[45] Mar. 5, 1974

[54] HYDRAULIC FISH UNLOADING APPARATUS

[75] Inventor: Milton H. McLean, White Rock, British Columbia, Canada

[73] Assignee: British Columbia Packers Limited, Richmond, British Columbia, Canada

[22] Filed: Dec. 11, 1972

[21] Appl. No.: 314,220

[30] Foreign Application Priority Data
Dec. 21, 1971 Canada .................................. 130622

[52] U.S. Cl. .................... 214/14, 214/13, 214/15 B, 302/14
[51] Int. Cl. ............................................. B65g 53/30
[58] Field of Search ...... 302/15, 14; 214/12, 13, 14, 214/15 R, 15 B; 43/4.5, 6.5

[56] References Cited
UNITED STATES PATENTS

| | | | |
|---|---|---|---|
| 2,396,305 | 3/1946 | Toft | 214/14 |
| 2,573,907 | 11/1951 | Humphreys | 214/15 B X |
| 2,794,685 | 6/1957 | Willis | 302/14 |
| 3,226,164 | 12/1965 | Merrick | 302/14 |

Primary Examiner—Frank E. Werner
Attorney, Agent, or Firm—Fetherstonhaugh & Co.

[57] ABSTRACT

A floating platform having a water-tight caisson depending below the level of the water upon which the platform floats. A syphon pipe extends from the bottom of the caisson into the hold of the vessel to be unloaded, and a pump keeps the level of the water in the caisson below the level of the water in the hold, creating a suction action which sucks water and fish out of the hold into the caisson. Suitable elevator means in the caisson lifts the fish therefrom and discharges them above the caisson.

14 Claims, 5 Drawing Figures

3,795,325

HYDRAULIC FISH UNLOADING APPARATUS

This invention relates to apparatus for hydraulically unloading fish from the holds of vessels and the like without damaging the fish.

The unloading of fish from vessels has been, up to the present time, primarily a manual operation. In some cases, the fish are handled individually by fish peughs or spears to transfer them into unloading boxes or onto conveyors. This is slow, costly, and depreciates the quality of the fish and the productivity attained therefrom. Some boats are unloaded in part by brailers or scoop nets, and then pumped out and the remaining fish removed manually as described above.

Some efforts have been made to provide apparatus for unloading vessels by pump means. However, with some of the prior apparatus, the fish go through the pump impellers and as a result a fair percentage are damaged thereby. Other types of pump apparatus of the prior art are quite large and costly, and complicated and difficult to operate and maintain. The disadvantages of the prior pumping arrangement are such that a great deal of the fish unloading is done manually, as described above.

The present unloading apparatus eliminates the problems pointed out above with respect to the prior pumping systems. In the present apparatus, a pump is used for removing fish from the holds of vessels, but the fish do not go through the pump. In addition to this, the apparatus employed is extremely simple, easy to operate and maintain, and does not require large power-consuming pumps.

Unloading apparatus in accordance with the present invention comprises a loading platform, a water-tight caisson at the platform extending down into the water and having a lower end below the level of said water. A syphon pipe has an end communicating with the caisson near the lower end thereof and an opposite free end adapted to be inserted into the hold of a vessel to be unloaded. When it is desired to unload fish from the vessel hold, there is water in the hold and in the caisson. A pump is operable to keep the level of the water in the caisson below the level of the water of the hold. Once the syphon pipe has been primed, fish and water are syphoned out of the hold into the caisson. Means is provided for removing fish from the caisson. This latter means is usually a fish elevator which extends from near the bottom of the caisson to a discharge end above the top of the latter.

Figure 2:
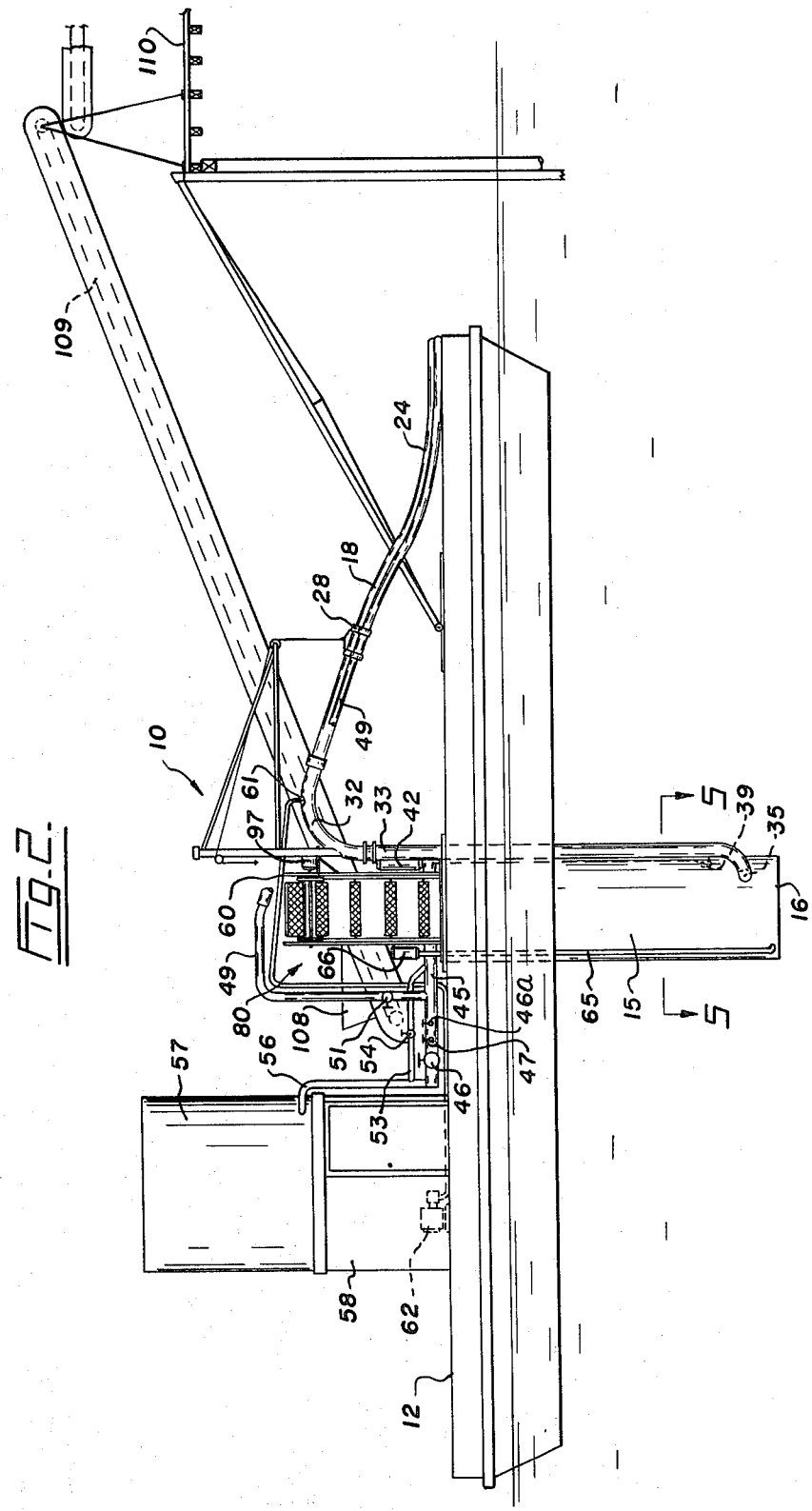
Figure 3:
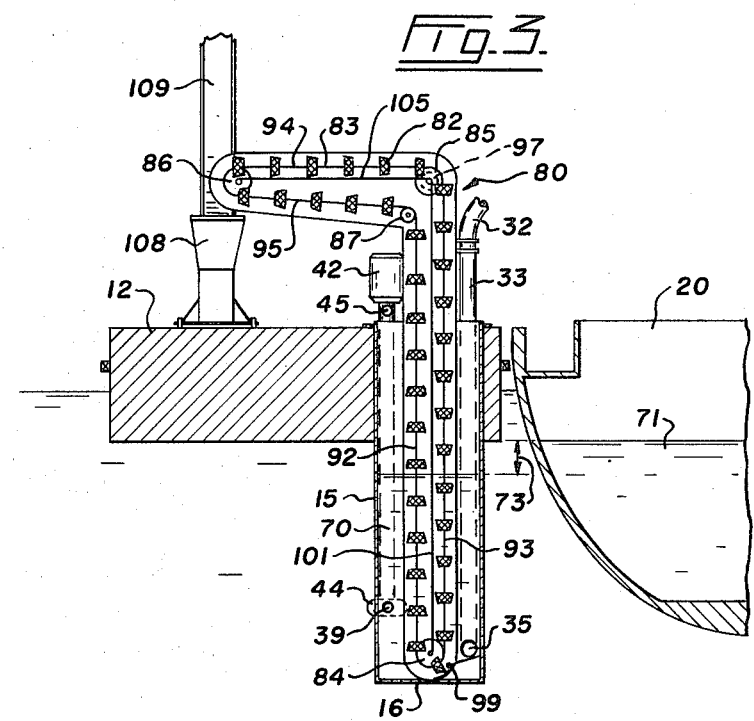
Figure 4:
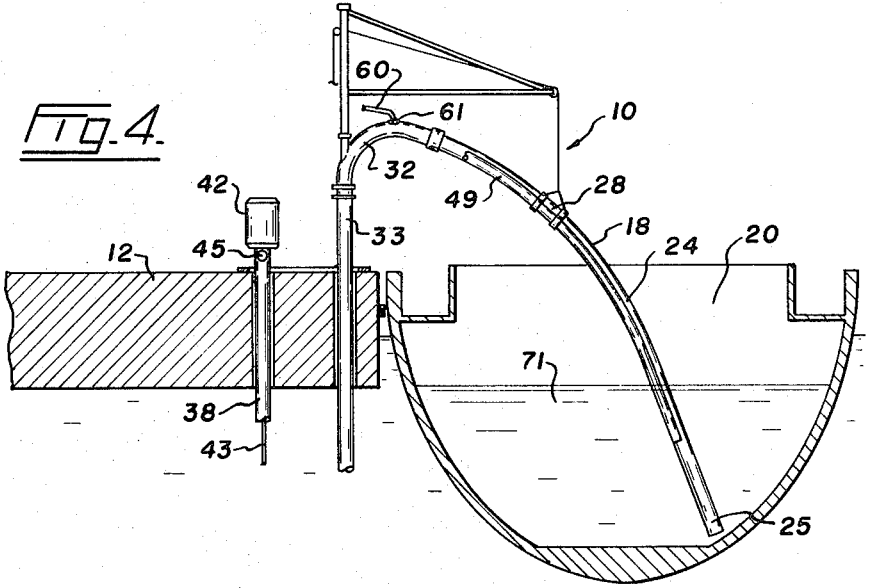
Figure 5:
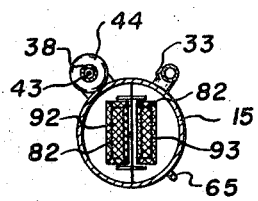

An example of hydraulic fish unloading apparatus in accordance with this invention is illustrated in the accompanying drawings, in which FIG. 1 is a plan view of the apparatus, FIG. 2 is a side elevation of the apparatus, FIG. 3 is a cross-section taken on the line 3—3 of FIG. 1, showing part of a boat in the unloading position, FIG. 4 is a section taken on the line 4—4 of FIG. 1 and through a boat in the unloading position, and FIG. 5 is a cross-section taken on the line 5—5 of FIG. 1.

Referring to the drawings, 10 is fish unloading apparatus in accordance with the present invention, and this apparatus includes a platform or scow 12. If the apparatus is used in tidal water, the platform should rise and fall with the tide, but if the level of the water is substantially constant, the platform can be in the form of a dock or other fixed landing. A caisson 15 is provided for this apparatus, and in this example, the ciasson depends from platform 12 and opens out above the level thereof. This caisson is watertight, and has a bottom 16 which is below the level of the surface of the water in which the platform floats.

A syphon pipe 18 communicates at one end with a caisson near the lower end thereof, and has an opposite free end adapted to be inserted into the hold of a vessel to be unloaded. A vessel 20 is shown in FIGS. 3 and 4 moored at float 12 in a position to be unloaded. In this example, the syphon pipe consists of a flexible hose 24 having a free end 25 adapted to be placed in the hold of the vessel, said hose being supported by a cable 26 of a hoist 27 mounted on the platform. The cable is connected to a saddle 28 through which pipe 24 extends. The inner end of this pipe is connected to a swivel elbow 32 which is swingably connected to the upper end of a pipe 33, said pipe extending downwardly relative to caisson 15 and opening into the latter at 35 near the bottom 16 thereof, see FIG. 3.

Suitable pump means is provided for removing water from caisson 15 near the lower end thereof. A pump case 38 opens into the lower end of the caisson at 39, see FIG. 3, and extends upwardly through platform 12. A motor 42 is mounted on the upper end of case 38, and has a long drive shaft 43 which extends downwardly through the case to a sump pump 44 near the lower end thereof. This pump removes water from the caisson and directs it upwardly through case 38 and into an outlet pipe 45 having a shut-off valve 46 therein. One or more discharge pipes 46a having valves 47 is or are connected to pipe 45. From this outlet pipe the water flows through a return pipe or hose 49 which is connected to pipe 45 and passes through saddle 28 and co-extends with hose 24. A valve 51 is provided in pipe 49 near outlet pipe 45. A by-pass pipe 53 having a valve 54 therein extends from pipe 45 between motor 42 and return pipe 49 to a vertical pipe 56 which extends up to a surge tank 57 mounted on a housing 58 on platform 12.

A vacuum line 60 extends from the highest point 61 of syphon pipe 18 to a vacuum pump 62 located in housing 58.

If desired, a clean-out line 65 may be provided for caisson 15 extending upwardly from near its bottom 16 to a pump 66 mounted on platform 12 above the caisson.

When pump 44 is operated, water is sucked out of caisson 15 and is directed through pipes 45 and 49 into the hold of vessel 12. The pump is operated so that the level of water 70 in the caisson is maintained below the level of water 71 in the hold of the vessel, the water differential being indicated at 73 in FIG. 3. This creates a syphon effect in syphon tube 18, and when the latter is primed by means of pump 62 and pipe 60, water is syphoned out of the vessel hold along with the fish in said water. These fish are drawn through pipe 18 into the bottompart of caisson 15.

Suitable means is provided for removing fish from caisson 15, and a fish elevator 80 is provided for this purpose. Elevator 80 is preferably a bucket-type elevator, and has a plurality of perforated buckets 82 carried by an endless cable or chain 83 which extends around a pulley 84 located at the bottom of the caisson, and around horizontally spaced pulleys 85 and 86. Another pulley 87 is located above pulley 84 and just below the level of pulleys 85 and 86. The cable and buckets of the elevator have a downwardly moving run 92, an upwardly mvoing run 93, a horizontal run 94, and a return run 95. A motor 97 connected to pulley 85 operates the conveyor.

A guide or baffle 99 in caisson 15 extends beneath the inlet end of the syphon pipe 18 to beneath the position where buckets 82 move around pulley 84. This baffle is located below the lower end of elevator run 93 so that it directs fish from the syphon pipe into the buckets.

Suitable screening means is provided in the caisson between syphon pipe 18 and outlet case 38, and in this example, a screen 101 extends downwardly between runs 92 and 93 of elevator 80 to the axle of lower pulley 84. This prevents fish from reaching the inlet end of pump case 38.

Elevator 80 has a horizontal section 105 which discharges fish from the caisson into or onto a suitable receiver. In this exmaple, the fish are directed into a hopper 108 over the end of an inclined belt conveyor 109 which extends from platform 12 up to and over a dock 110. Water draining from the fish in horizontal section 105 of the conveyor is directed back into the caisson.

The operation of apparatus 10 is quite simple. Once the hose 24 of the syphon line 18 is inserted into the hold of vessel 20, pump 44 is operated to remove water from caisson 15 and normally to return the water to the hold through pipe 49. The pump is operated so as to maintain the water differential 73, and this causes a syphon action through pipe 18 to suck water and fish out of the hold and direct them into the bottom of caisson 15 where they are picked up by the upwardly moving buckets 82 of elevator 80. These buckets, being perforated, lift the fish only out of the caisson, move them along elevator section 105 and dump them into hopper 108, whence they are moved by conveyor 109 to dock 110.

If the movement of fish out of the hold slows down, that is, there is considerably more water than fish being syphoned out of the vessel, the water can be discharged through pipes 46 until the fish flow is corrected. If it is desired to pump out the hold for any purpose, the water can be discharged, or it can be pumped into tank 57 where it is ready to be directed into the caisson and thence pumped into the hold.

The following is provided for general information only and is not to be considered limiting in any way. With a 24 inch water differential in water levels the flow through the syphon is about 2,000 G.P.M. It has been found that a fish to water mix in the hold of 1 to 10 is very satisfactory for the operation of this apparatus. A 2,000 G.P.M. flow unloads about 120,000 pounds of fish per hour, or at a 6 pound average for the fish, 20,000 fish per hour.

Although this apparatus has been described in connection with unloading fish from the holds of vessels, it can be used for unloading other containers, such as, for example, tanks for holding fish or other articles in water, and the expression "vessel hold" as used herein is intended to include any holding devices.

I claim:

1. Apparatus for unloading fish from fish-carrying vessels and the like, comprising a platform, a water-tight ciasson at the platform extending into the water and having a lower end below the level of said water, a syphon pipe having an end communicating with the caisson near the lower end thereof and an opposite free end adapted to be inserted into the hold of vessel to be unloaded, when it is desired to unload fish from the vessel hold thee being water in said hold and in the caisson, a pump operable to keep the level of the water in the caisson below the level of the water of the hold, whereby once the syphon pipe has been primed fish and water are syphoned out of the hold into the caisson, and means for removing fish from the caisson.

2. Unloading apparatus as claimed in claim 1 including a pipe extendable from the pump to the vessel hold, whereby said pump transfers water from the caisson to the hold.

3. Unloading apparatus as claimed in claim 2 in which said removing means comprises a fish elevator extending from near the bottom of the caisson upwardly to a discharge end above the platform.

4. Unloading apparatus as claimed in claim 2 in which said pump is a suction pump mounted on thp platform, and including a suction line extending from the pump and opening into the caisson below the water level therein.

5. Unloading apparatus as claimed in claim 1 in which said removing means comprises a fish elevator extending from near the bottom of the caisson upwardly to a discharge end above the platform.

6. Unloading apparatus as claimed in claim 1 in which said pump is a suction pump mounted on the platform, and including a suction line extending from the pump and opening into the caisson below the water level therein.

7. Apparatus for unloading fish as claimed in claim 1 including a tank on the platform, means for selectively directing the water outflow from the pump into the tank, and means for selectively directing water from the tank to the caisson hold.

8. Apparatus for unloading fish as claimed in claim 1 including a pump connected to the highest point of the syphon pipe and operable to prime said syphon pipe.

9. Apparatus for unloading fish from fish-carrying vessels, comprising a platform, a water-tight caisson depending from the platform below the level of the water upon which the platform floats, a syphon pipe having an end communicating with the caisson near the lower end thereof and an opposite free end adapted to be inserted into the hold of a vessel to be unloaded, when it is desired to unload fish from the vessel hold there being water in said hold and in the caisson, a pump having inlet pipe means opening into the caisson near the bottom thereof and discharge pipe means extendable into the vessel hold, and a bucket-type elevator in the caisson extending from near the bottom thereof to a discharge end above the caisson.

10. Apparatus for unloading fish as claimed in claim 9 in which said elevator comprises buckets movable downwardly in one run and movable upwardly in another run, said end of the syphon pipe communicating with the caisson and opening thereinto near said one run of the elevator, and including screening means between said end of the syphon pipe and the inlet pipe means of the pump.

11. Apparatus for unloading fish as claimed in claim 10 including guide means in the caisson for directing fish from the end of the syphon pipe to the buckets of the elevator.

12. Apparatus for unloading fish as claimed in claim 9 including guide means in the caisson for directing fish from the end of the syphon pipe to the buckets of the elevator.

13. Apparatus for unloading fish as claimed in claim 9 including a tank on the platform, means for selectively directing the water outflow from the pump into the tank, and means for selectively directing water from the tank to the caisson.

14. Apparatus for unloading fish as claimed in claim 9 including a pump connected to the highest point of the syphon pipe and operable to prime said syphon pipe.

\* \* \* \* \*